United States Patent [19]

Hutchinson et al.

[11] Patent Number: 5,518,262
[45] Date of Patent: May 21, 1996

[54] TOWING ASSEMBLY FOR A PORTABLE MACHINE

[75] Inventors: William R. Hutchinson, Clemmons; Louis A. Gibbons, Advance, both of N.C.

[73] Assignee: Ingersoll-Rand Company, Woodcliff Lake, N.J.

[21] Appl. No.: 373,928

[22] Filed: Jan. 17, 1995

[51] Int. Cl.⁶ .................................................. B60D 1/14
[52] U.S. Cl. .......................... 280/475; 280/763.1
[58] Field of Search .................. 280/475, 763.1, 280/490.1, 490.2, 490.3, 490.4, 490.5, 408

[56] References Cited

U.S. PATENT DOCUMENTS

| | | | |
|---|---|---|---|
| 2,393,016 | 1/1946 | Black | 280/491.3 |
| 2,438,032 | 3/1948 | Bready | 280/475 |
| 2,848,241 | 8/1958 | Hubbard | 280/475 |
| 4,063,750 | 12/1977 | Mutchler | 280/275 |
| 4,740,008 | 4/1988 | Johnson | 280/475 |

FOREIGN PATENT DOCUMENTS

| | | | |
|---|---|---|---|
| 150448 | 9/1981 | Germany | 280/475 |

*Primary Examiner*—Mitchell J. Hill
*Attorney, Agent, or Firm*—John J. Selko; Michael M. Gnibus

[57] ABSTRACT

A towing assembly for towing a portable machine across a surface includes a drawbar assembly pivotally connected to a frame member of the machine, to permit the drawbar assembly to be pivotable between a first towing position a second support position. An adjustable support assembly is removably connected to the machine for selectably supporting one end of the machine on the surface.

11 Claims, 3 Drawing Sheets

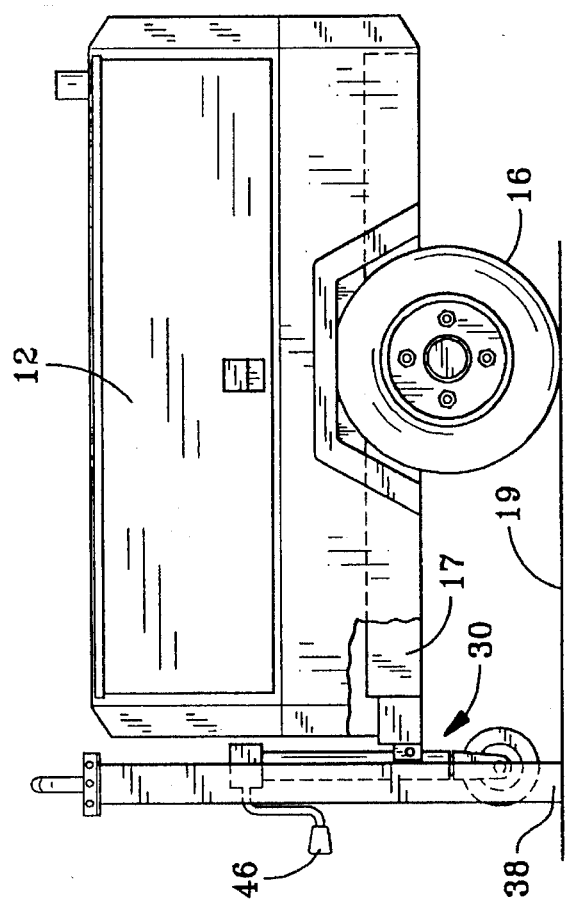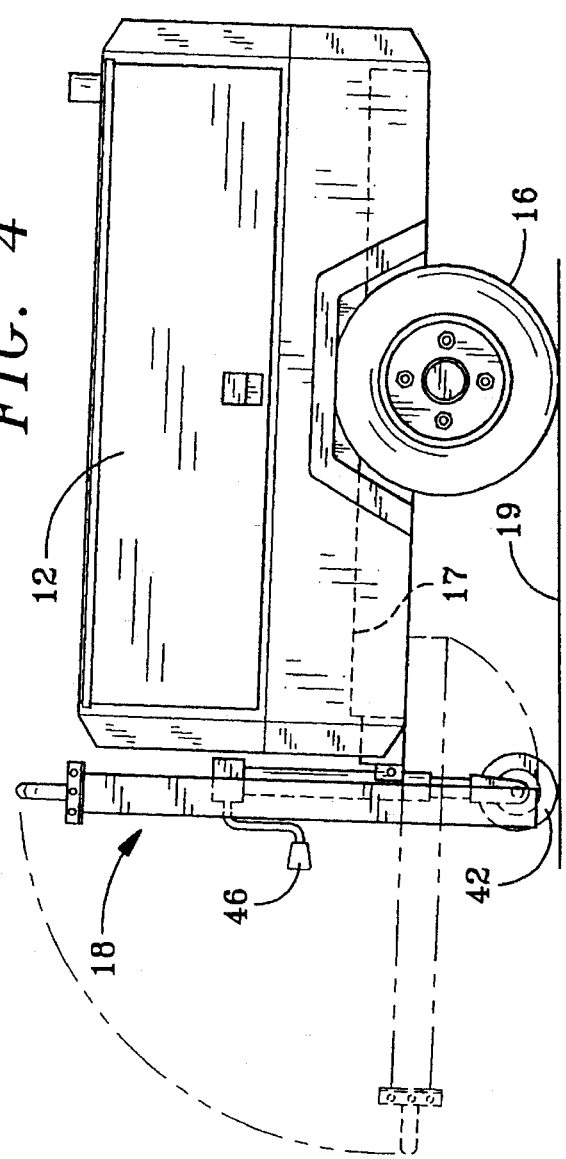

TOWING ASSEMBLY FOR A PORTABLE MACHINE

BACKGROUND OF THE INVENTION

This invention generally relates to towable machines, and more particularly to an improved towing assembly for a towable machine.

To date, two-wheeled trailer assemblies for portable machines, such as but not limited to portable air compressors, have used either a straight or A-frame type drawbar rigidly attached to a trailer assembly frame. (Typically, such a drawbar is either welded or bolted to such a trailer assembly frame.) Present towable, portable air compressors employ a trailer assembly frame, a drawbar rigidly mounted thereto, and a running gear which together function as a two-wheeled trailer assembly therefor. Usually, when such a portable air compressor is shipped from a manufacturing site to a predetermined destination, such as a distribution site, a flatbed trailer truck is employed.

It has been discovered that the present design of such trailer assemblies unnecessarily limits the number of portable air compressors, or other type portable machines employing similar trailer assemblies, which can be shipped by a single flatbed trailer truck. The drawbar assembly of present portable compressors comprises about ⅓ the total length of the portable air compressor. Such a drawbar design "wastes" significant "shipping space", which, of course, increases the shipping costs associated with the transportation of such portable air compressors to the predetermined destination.

In the past, methods have been employed to lessen the drawbar's cost impact. Such methods have included "nesting" one drawbar under an adjacent portable compressor situated on the flatbed trailer truck, or removing, if possible, the drawbar and loading the portable compressors in relative close proximity, next to each other. The first method requires the units to be loaded end to end and offers only a minimal improvement to the amount of shipping space "wasted" by the drawbar design. The second method increases the number of portable compressors which can be shipped by a single flatbed trailer truck, however, additional costly labor is required to dis-assemble/re-assemble the drawbar. A similar "space" problem occurs at a destination site where a plurality of such portable compressors are to be stored, i.e. the drawbar design "wastes" valuable space.

The foregoing illustrates limitations known to exist in present trailer assemblies for portable machines. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a towing assembly for towing a portable machine across a surface, the portable machine including a support frame, the towing assembly comprising: a frame member; machine mounted on the frame member; a drawbar assembly; means for pivotally connecting the drawbar assembly to the frame member, to permit the drawbar assembly to be pivotable between a first towing position wherein the drawbar assembly is disposed substantially parallel to the surface, and a second supporting position wherein the drawbar assembly is disposed substantially perpendicular to the surface, whereby a portion of the drawbar assembly can engage the surface to support the first end of the portable machine; and an adjustable support means removeably mounted to the support frame of the portable machine, the adjustable support means for selectably supporting a first end of the portable machine.

The foregoing and other aspects will become apparent from the following detailed description of the invention when considered in conjunction with the accompanying drawing figures.

BRIEF DESCRIPTION OF THE DRAWING FIGURES

FIG. 3 is a side elevational view of the portable machine illustrated in FIG. 1, and wherein the towing assembly is disposed in a ship or store arrangement; and FIG. 4 is a side elevational view of the portable machine illustrated in FIG. 1, with the towing assembly positioned in the ready or operational position.

DETAILED DESCRIPTION

Figure 1:
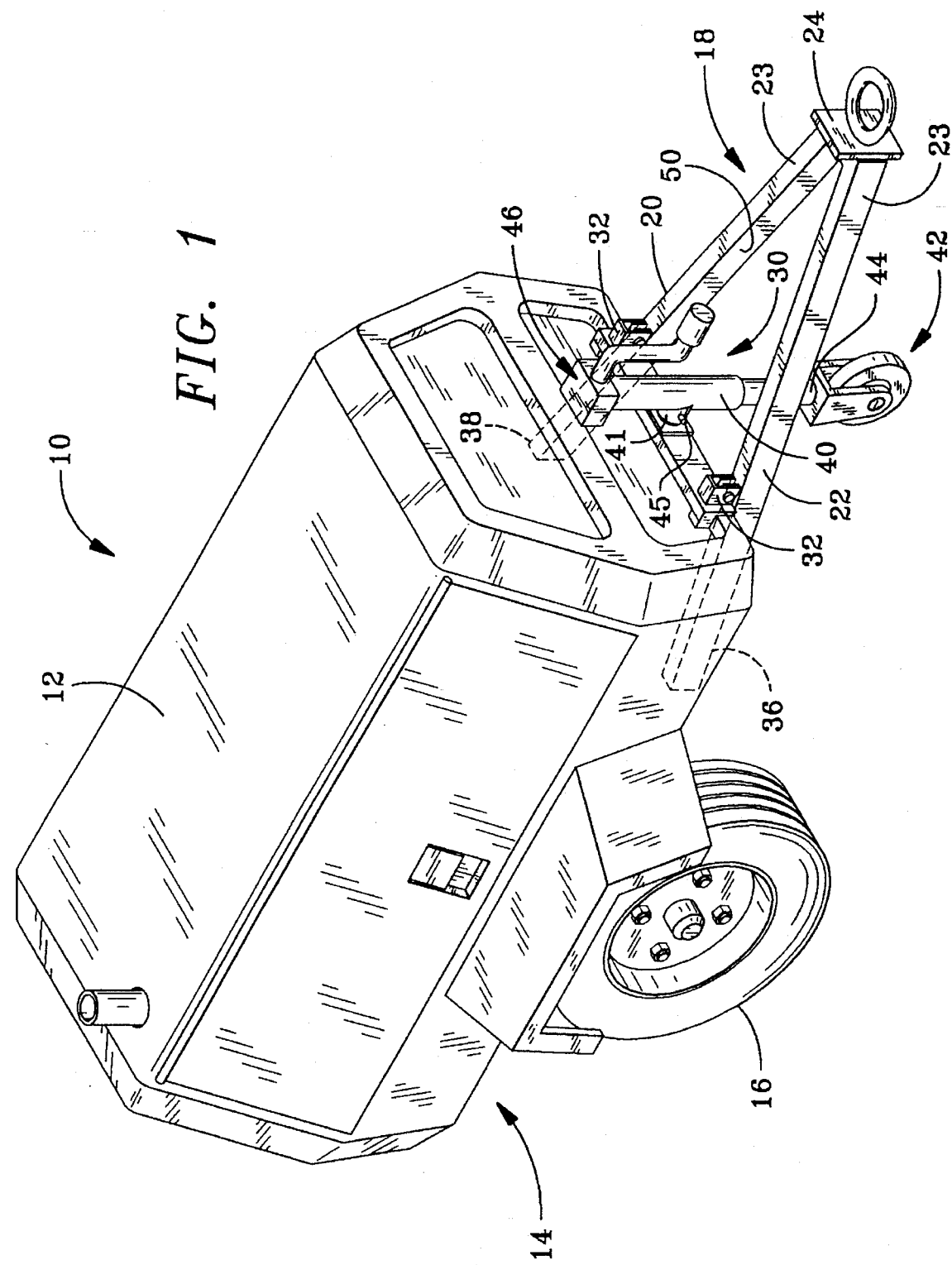
FIG. 1 is a perspective view of a portable machine which incorporates the towing assembly of the present invention.

Referring now to the drawings, wherein similar reference characters designate corresponding parts throughout the several views, the embodiment of the apparatus shown in FIG. 1 comprises a portable machine 10.

Apparatus 10 is a portable air compressor 12 mounted on a trailer 14 equipped with two wheels 16. Trailer 14 includes a support frame member 17. A towing assembly includes a drawbar assembly, shown generally as 18, having first and second opposed leg portions 20, 22, connected to each other, at the first end 23 of each leg portion 20, 22. A hitch assembly 24 is mounted to the first end 23. Adjustable support means 30 is removably mounted to support frame 17, for selectably supporting one end of trailer 14, as described hereinafter.

Drawbar assembly 18 is pivotably mounted to support frame 17 by a pair of spaced-apart hinges 32. One hinge connects each leg portion 20, 22 to support frame 17, permitting the drawbar assembly 18 to be pivotable between a first towing position wherein the integrally connected first and second leg portions 20, 22 are disposed substantially parallel to the surface 19 or frame 17 as shown in FIG. 4, and a second supporting position wherein the first and second leg portions 20, 22 form a bipod which is disposed substantially perpendicular to the surface 19 or frame 17 as shown in FIG. 3, the second ends 36, 38 of the first and second leg portions 20, 22 engaging the surface of the earth to support the first end of the trailer 14.

Adjustable support means 30 includes a first tubular support member 40 removably connected to frame member 17. Any conventional connection means will do, but we prefer to form a hollow, tubular mounting member 41 projecting outwardly on tubular member 40. Mounting member 41 is telescoped over an outwardly projecting stub (not shown) connected to frame member 17. The combination is locked together by a removable pin 45 extending through the mounting member 41 and stub. A wheel assembly 42 is fixedly connected to a second support member 44, the second support member 44 being telescopingly received within the first tubular support member 40. A conventional crank assembly 46 is connected to the first tubular support member 40, for raising and lowering the second support member 44 relative to the first tubular support member 40, as is well known.

Figure 2:
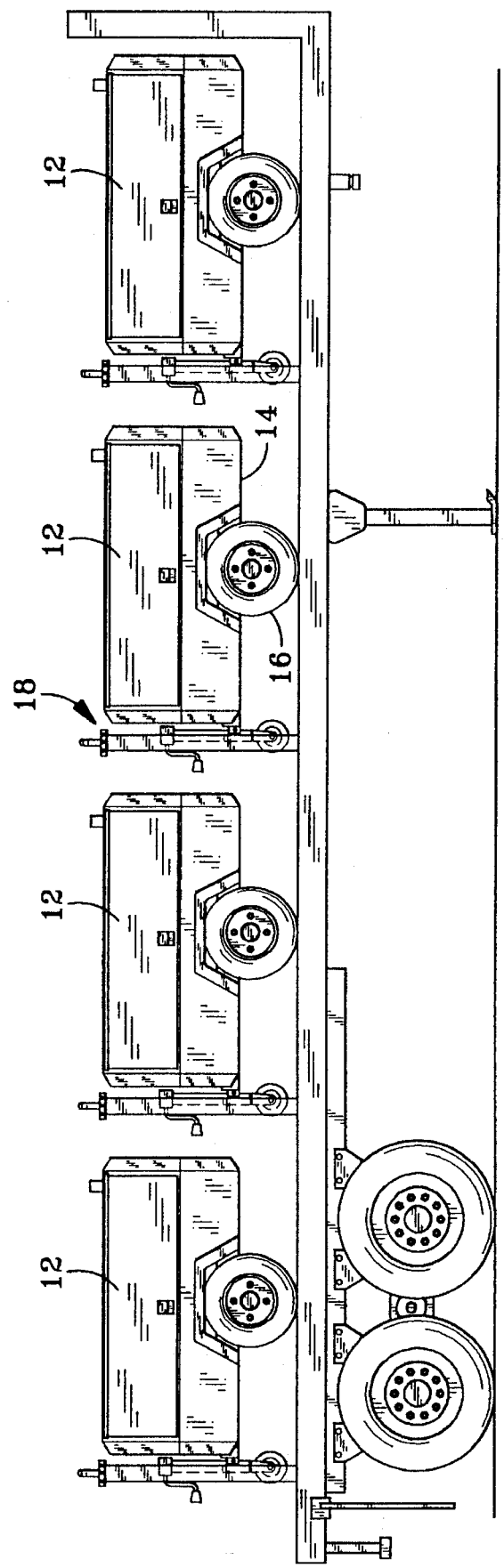
FIG. 2 is a side elevational view of a plurality of portable machines, of the type illustrated in FIG. 1, which are loaded on a flatbed trailer truck, and which are disposed in a ship arrangement.

We prefer to form drawbar assembly into an A-frame but other configurations will work. The leg portions 20 and 22 together define a drawbar recess 50. When the drawbar is in the towing position, the adjustable support means extends through the drawbar recess in the manner shown in FIG. 1. When the drawbar forms a bipod, the adjustable support means 30 is located substantially within the drawbar opening as shown in FIG. 2.

While this invention has been illustrated and described in accordance with a preferred embodiment, it is recognized that variations and changes may be made therein without departing from the invention as set forth in the following claims.

Having described the invention, what is claimed is:

1. A portable machine comprising:

a frame member;

a compressor mounted on the frame member;

a drawbar assembly for transporting the compressor across a surface; and means for pivotally connecting the drawbar assembly to the frame member, to permit the drawbar assembly to be pivotal between a first towing position wherein the drawbar assembly is disposed substantially parallel to the surface, and a second supporting position wherein the drawbar assembly is disposed substantially perpendicular to the surface, whereby a portion of the drawbar assembly can engage the surface to support the first end of the portable machine.

2. A portable machine, as claimed in claim 1, and wherein the drawbar assembly includes adjustable support means for selectably supporting a first end of the machine, wherein the support means comprises:

a first tubular support member, connected to the frame member;

a wheel assembly;

a second support member connected to the wheel assembly, the second support member being telescopingly received within the first tubular support member; and a crank assembly mounted to the first tubular support member for selectably positioning the second support member in a predetermined telescoping arrangement relative to the first tubular support member.

3. A towing assembly for towing a portable machine across a surface, the portable machine including a support frame, the towing assembly comprising:

a drawbar assembly having first and second leg portions, each leg portion having opposed first and second ends, wherein the first and second leg portions are integrally connected, one to each other, at the first end of each of the leg portions;

a hitch assembly mounted to the first end of the integrally connected first and second leg portions;

an adjustable support means removeably mounted to the support frame of the portable machine, the adjustable support means for selectably supporting a first end of the portable machine; and a mounting means for pivotably mounting the drawbar assembly to the support frame, the mounting means permitting the drawbar assembly to be pivotable between a first towing position wherein the integrally connected first and second leg portions are disposed substantially parallel to the support frame, and a second supporting position wherein the first and second leg portions form a bipod which is disposed substantially perpendicular to the support frame, the second ends of the first and second leg portions engaging the surface to support the first end of the portable machine.

4. A towing assembly, as claimed in claim 3, and wherein the portable machine is a portable compressor.

5. The towing assembly as claimed in claim 3 wherein the first and second leg portions together define a drawbar recess, and adjustable support means is located substantially within the drawbar recess when the drawbar is in the supporting position and extends through the recess when the drawbar is in the towing position.

6. A combination comprising:

a) a frame;

b) a machine mounted on the frame;

c) a towing assembly comprising: a drawbar assembly having first and second leg portions, each leg portion having opposed first and second ends, wherein the first and second leg portions are integrally connected, one to each other at the first end of each of the leg portions the first and second leg portions defining a drawbar recess; and means for pivotally connecting the drawbar assembly to the frame to permit the drawbar assembly to be pivotable between a first towing position wherein the drawbar assembly is disposed substantially parallel to the frame, and a second supporting position wherein the drawbar assembly is disposed substantially perpendicular to the frame; and d) adjustable support means for selectably positioning the drawbar assembly, the adjustable support means extendable through the drawbar recess when the recess is in the towing position and located substantially within the recess when the drawbar is in the supporting position.

7. The combination as claimed in claim 6 wherein the machine is a compressor.

8. The combination as claimed in claim 6 wherein the adjustable support means comprises:

a first tubular support member, connected to the frame;

a wheel assembly;

a second support member connected to the wheel assembly, the second support member being telescopingly received within the first tubular support member; and a crank assembly mounted to the first tubular support member for selectably positioning the second support member in a predetermined telescoping arrangement relative to the first tubular support member.

9. The combination as claimed in claim 8 wherein the first tubular support member is removably connected to the frame.

10. The combination as claimed in claim 6 wherein the drawbar assembly further includes a hitch assembly mounted to the first ends of the leg portions.

11. The combination as claimed in claim 6 wherein the drawbar assembly is formed into an A-frame.

* * * * *